(12) United States Patent
Lin et al.

(10) Patent No.: US 8,083,871 B2
(45) Date of Patent: Dec. 27, 2011

(54) HIGH CRASHWORTHINESS AL-SI-MG ALLOY AND METHODS FOR PRODUCING AUTOMOTIVE CASTING

(75) Inventors: Jen C. Lin, Export, PA (US); Moustapha Mbaye, Ada, MI (US); Jan Ove Löland, Farsund (NO); Russell S. Long, Murrysville, PA (US); Xinyan Yan, Murrysville, PA (US)

(73) Assignee: Automotive Casting Technology, Inc., Fruitport, MI (US)

( * ) Notice: Subject to any disclaimer, the term of this patent is extended or adjusted under 35 U.S.C. 154(b) by 647 days.

(21) Appl. No.: 11/553,236

(22) Filed: Oct. 26, 2006

(65) Prior Publication Data
US 2007/0125460 A1    Jun. 7, 2007

Related U.S. Application Data

(60) Provisional application No. 60/731,046, filed on Oct. 28, 2005.

(51) Int. Cl.
*C22C 21/02* (2006.01)
*C22C 21/04* (2006.01)

(52) U.S. Cl. ........................ 148/440; 420/546

(58) Field of Classification Search .......... 148/415–417, 148/437, 440, 549, 688, 698; 420/534–536, 420/541, 542, 544, 546, 548
See application file for complete search history.

(56) References Cited

U.S. PATENT DOCUMENTS

| | | | |
|---|---|---|---|
| 3,135,633 A | 6/1964 | Hornus | |
| 3,305,410 A | 2/1967 | Sublett et al. | |
| 3,542,606 A | 11/1970 | Westerman et al. | |
| 3,619,181 A | 11/1971 | Willey et al. | |
| 3,645,804 A | 2/1972 | Ponchel | |
| 3,741,827 A | 6/1973 | Reynolds et al. | |
| 3,762,916 A | 10/1973 | Kirman | |
| 3,836,405 A | 9/1974 | Staley et al. | |

(Continued)

FOREIGN PATENT DOCUMENTS

AU    1154013    6/1966
(Continued)

OTHER PUBLICATIONS

Dorward, R, Enhanced Corrosion Resistance in Al-Zn-Mg-Cu Alloys, *Extraction, Refining and Fabrication of Light Metals*, 1990, 383-391.

(Continued)

*Primary Examiner* — George Wyszomierski
*Assistant Examiner* — Mark L Shevin
(74) *Attorney, Agent, or Firm* — Syndicated Law; Brian S. Boyer

(57) ABSTRACT

The present invention provides a casting having increased crashworthiness including an aluminum alloy of about 6.0 wt % to about 8.0 wt % Si; about 0.12 wt % to about 0.25 wt % Mg; less than or equal to about 0.35 wt % Cu; less than or equal to about 4.0 wt % Zn; less than or equal to about 0.6 wt % Mn; and less than or equal to about 0.15 wt % Fe, wherein the cast body is treated to a T5 or T6 temper and has a tensile strength ranging from 100 MPa to 180 MPa and has a critical fracture strain greater than 10%. The present invention further provides a method of forming a casting having increased crashworthiness.

16 Claims, 7 Drawing Sheets

U.S. PATENT DOCUMENTS

| | | | |
|---|---|---|---|
| 3,856,584 A | 12/1974 | Cina | |
| 3,881,966 A | 5/1975 | Staley et al. | |
| 3,925,067 A | 12/1975 | Sperry et al. | |
| 3,945,860 A | 3/1976 | Winter et al. | |
| 3,947,297 A | 3/1976 | Reimann et al. | |
| 4,067,733 A | 1/1978 | Urdea | |
| 4,094,705 A | 6/1978 | Sperry et al. | |
| 4,104,089 A | 8/1978 | Miki | |
| 4,189,334 A | 2/1980 | Dubost et al. | |
| 4,200,476 A | 4/1980 | Dubost et al. | |
| 4,294,625 A | 10/1981 | Hyatt et al. | |
| 4,323,399 A | 4/1982 | Dubost et al. | |
| 4,345,951 A | 8/1982 | Coupry et al. | |
| 4,431,467 A | 2/1984 | Staley et al. | |
| 4,477,292 A | 10/1984 | Brown | |
| 4,488,913 A | 12/1984 | Ferton | |
| 4,609,031 A | 9/1986 | Sasaki | |
| 4,618,382 A | 10/1986 | Miyagi et al. | |
| 4,629,517 A | 12/1986 | Lifka et al. | |
| 4,648,913 A | 3/1987 | Hunt, Jr. et al. | |
| 4,711,762 A | 12/1987 | Vernam et al. | |
| 4,747,890 A | 5/1988 | Meyer | |
| 4,797,165 A | 1/1989 | Bretz et al. | |
| 4,816,087 A | 3/1989 | Cho | |
| 4,828,631 A | 5/1989 | Ponchel et al. | |
| 4,830,826 A | 5/1989 | Ichiro | |
| 4,832,758 A | 5/1989 | Brown | |
| 4,863,528 A | 9/1989 | Brown et al. | |
| 4,873,054 A | 10/1989 | Sigworth | |
| 4,946,517 A | 8/1990 | Cho | |
| 4,954,188 A | 9/1990 | Ponchel et al. | |
| 4,961,792 A | 10/1990 | Rioja et al. | |
| 4,988,394 A | 1/1991 | Cho | |
| 5,047,092 A | 9/1991 | Faure | |
| 5,066,342 A | 11/1991 | Rioja et al. | |
| 5,108,520 A | 4/1992 | Liu et al. | |
| 5,110,372 A | 5/1992 | Faure | |
| 5,120,354 A | 6/1992 | Ichiki | |
| RE34,008 E | 7/1992 | Quist et al. | |
| 5,135,713 A | 8/1992 | Rioja et al. | |
| 5,151,136 A | 9/1992 | Witters et al. | |
| 5,211,910 A | 5/1993 | Pickens et al. | |
| 5,213,639 A | 5/1993 | Colvin et al. | |
| 5,221,377 A | 6/1993 | Hunt, Jr. et al. | |
| 5,240,522 A | 8/1993 | Tanaka et al. | |
| 5,277,719 A | 1/1994 | Kuhlman et al. | |
| 5,334,266 A | 8/1994 | Kawanishi et al. | |
| 5,376,192 A | 12/1994 | Cassada, III | |
| 5,413,650 A | 5/1995 | Jarrett et al. | |
| 5,496,426 A | 3/1996 | Murtha | |
| 5,512,112 A | 4/1996 | Cassada, III | |
| 5,537,969 A | 7/1996 | Hata et al. | |
| 5,560,789 A | 10/1996 | Sainfort et al. | |
| 5,588,477 A | 12/1996 | Sokol et al. | |
| 5,593,516 A | 1/1997 | Cassada, III | |
| 5,597,529 A | 1/1997 | Tack | |
| 5,630,889 A | 5/1997 | Karabin | |
| 5,652,063 A | 7/1997 | Karabin | |
| 5,665,306 A | 9/1997 | Karabin | |
| 5,669,990 A | 9/1997 | Adachi et al. | |
| 5,759,302 A | 6/1998 | Nakai et al. | |
| 5,800,927 A | 9/1998 | Karabin | |
| 5,837,070 A | 11/1998 | Sainfort et al. | |
| 5,846,347 A | 12/1998 | Tanaka et al. | |
| 5,863,359 A | 1/1999 | Karabin et al. | |
| 5,865,911 A | 2/1999 | Miyasato et al. | |
| 5,865,914 A | 2/1999 | Karabin et al. | |
| 5,879,475 A | 3/1999 | Karabin | |
| 5,922,147 A * | 7/1999 | Valtierra-Gallardo et al. | 148/549 |
| 5,932,037 A | 8/1999 | Holroyd et al. | |
| 5,989,495 A | 11/1999 | Isayama et al. | |
| 6,027,582 A | 2/2000 | Shahani et al. | |
| 6,048,415 A | 4/2000 | Nakai et al. | |
| 6,070,643 A | 6/2000 | Colvin | |
| 6,145,466 A | 11/2000 | Herbein et al. | |
| 6,148,899 A | 11/2000 | Cornie et al. | |
| 6,182,591 B1 | 2/2001 | Whitesides et al. | |
| 6,224,693 B1 * | 5/2001 | Garza-Ondarza et al. | 148/549 |
| 6,231,809 B1 | 5/2001 | Matsumoto et al. | |
| 6,231,995 B1 | 5/2001 | Yamashita et al. | |
| 6,267,829 B1 | 7/2001 | Backerud et al. | |
| 6,302,973 B1 | 10/2001 | Haszler et al. | |
| 6,308,999 B1 | 10/2001 | Tan et al. | |
| 6,311,759 B1 | 11/2001 | Tausig et al. | |
| 6,314,905 B1 | 11/2001 | Herbein et al. | |
| 6,338,817 B2 | 1/2002 | Yamashita et al. | |
| 6,342,111 B1 | 1/2002 | Meki et al. | |
| 6,364,970 B1 | 4/2002 | Hielscher et al. | |
| 6,368,427 B1 | 4/2002 | Sigworth | |
| 6,412,164 B1 * | 7/2002 | DeYoung et al. | 29/527.5 |
| 6,423,163 B2 | 7/2002 | Smolej et al. | |
| 6,444,058 B1 | 9/2002 | Liu et al. | |
| 6,458,224 B1 | 10/2002 | Ren et al. | |
| 6,508,035 B1 | 1/2003 | Seksaria et al. | |
| 6,511,555 B2 | 1/2003 | Feikus et al. | |
| 6,562,155 B1 | 5/2003 | Mikubo et al. | |
| 6,565,684 B2 | 5/2003 | Sigli et al. | |
| 6,595,467 B2 | 7/2003 | Schmidt | |
| 6,711,819 B2 | 3/2004 | Stall et al. | |
| 6,755,461 B2 | 6/2004 | Seksaria et al. | |
| 6,769,733 B2 | 8/2004 | Seksaria et al. | |
| 6,773,666 B2 | 8/2004 | Lin et al. | |
| 6,780,525 B2 | 8/2004 | Litwinski | |
| 6,783,730 B2 | 8/2004 | Lin et al. | |
| 6,783,869 B2 | 8/2004 | Humer et al. | |
| 6,790,407 B2 | 9/2004 | Fridlyander et al. | |
| 6,808,003 B2 | 10/2004 | Raghunathan et al. | |
| 6,848,233 B1 | 2/2005 | Haszler et al. | |
| 6,855,234 B2 | 2/2005 | D'Astolfo, Jr. | |
| 6,884,637 B2 | 4/2005 | Umemura et al. | |
| 6,886,886 B2 | 5/2005 | Seksaria et al. | |
| 6,893,065 B2 | 5/2005 | Seksaria et al. | |
| 6,972,110 B2 | 12/2005 | Chakrabarti et al. | |
| 7,045,094 B2 | 5/2006 | Axenov et al. | |
| 7,048,815 B2 | 5/2006 | Senkov et al. | |
| 7,060,139 B2 | 6/2006 | Senkov et al. | |
| 7,087,125 B2 * | 8/2006 | Lin et al. | 148/417 |
| 7,097,719 B2 | 8/2006 | Bray et al. | |
| 7,118,166 B2 | 10/2006 | Seksaria et al. | |
| 7,135,077 B2 | 11/2006 | Warner | |
| 7,163,076 B2 | 1/2007 | Seksaria et al. | |
| 7,214,279 B2 | 5/2007 | Fischer et al. | |
| 7,214,281 B2 | 5/2007 | Gheorghe et al. | |
| 7,217,279 B2 | 5/2007 | Reese | |
| 7,229,508 B2 | 6/2007 | Cho et al. | |
| 7,229,509 B2 | 6/2007 | Cho | |
| 7,383,776 B2 | 6/2008 | Amick | |
| 7,438,772 B2 | 10/2008 | Rioja et al. | |
| 7,449,073 B2 | 11/2008 | Lin et al. | |
| 7,452,429 B2 | 11/2008 | Boselli et al. | |
| 7,490,752 B2 | 2/2009 | Ehrstrom et al. | |
| 7,547,366 B2 | 6/2009 | Lin et al. | |
| 7,550,110 B2 | 6/2009 | Warner et al. | |
| 7,625,454 B2 | 12/2009 | Lin et al. | |
| 7,666,267 B2 | 2/2010 | Benedictus et al. | |
| 2001/0028860 A1 | 10/2001 | Fang et al. | |
| 2001/0028861 A1 | 10/2001 | Fang et al. | |
| 2002/0060059 A1 | 5/2002 | Komazaki et al. | |
| 2002/0150498 A1 | 10/2002 | Chakrabarti et al. | |
| 2002/0153072 A1 | 10/2002 | Tanaka et al. | |
| 2002/0155023 A1 | 10/2002 | Barresi et al. | |
| 2002/0162609 A1 | 11/2002 | Warner | |
| 2003/0085592 A1 | 5/2003 | Seksaria et al. | |
| 2003/0178106 A1 | 9/2003 | DasGupta | |
| 2004/0011437 A1 * | 1/2004 | Lin et al. | 148/549 |
| 2004/0062678 A1 | 4/2004 | DasGupta | |
| 2004/0079198 A1 | 4/2004 | Bryant et al. | |
| 2004/0099352 A1 | 5/2004 | Gheorghe et al. | |
| 2004/0107823 A1 | 6/2004 | Kiley et al. | |
| 2004/0163492 A1 | 8/2004 | Crowley et al. | |
| 2004/0170523 A1 | 9/2004 | Koch | |
| 2004/0261916 A1 | 12/2004 | Lin et al. | |
| 2005/0008890 A1 | 1/2005 | Raghunathan et al. | |
| 2005/0034794 A1 | 2/2005 | Benedictus et al. | |
| 2005/0056353 A1 | 3/2005 | Brooks et al. | |

| | | | | | | |
|---|---|---|---|---|---|---|
| 2005/0072497 | A1 | 4/2005 | Eberl et al. | JP | 06065666 | 3/1994 |
| 2005/0079376 | A1 | 4/2005 | Benedictus et al. | JP | 06212338 | 8/1994 |
| 2005/0098245 | A1 | 5/2005 | Venema et al. | JP | 07252573 | 10/1995 |
| 2005/0100473 | A1* | 5/2005 | Ikuno et al. ............... 420/534 | JP | 08144031 | 6/1996 |
| 2005/0150578 | A1 | 7/2005 | Bes et al. | JP | 10130768 | 5/1998 |
| 2005/0150579 | A1 | 7/2005 | Chakrabarti et al. | JP | 10168536 | 6/1998 |
| 2005/0155676 | A1* | 7/2005 | Cosse et al. .............. 148/415 | JP | 10298692 | 11/1998 |
| 2005/0161128 | A1 | 7/2005 | DasGupta | JP | 11 241135 A | 9/1999 |
| 2005/0163647 | A1* | 7/2005 | Donahue et al. ............ 420/537 | JP | 11241135 | 9/1999 |
| 2005/0167012 | A1* | 8/2005 | Lin et al. .................. 148/549 | JP | 2001 073056 | 3/2001 |
| 2005/0191204 | A1* | 9/2005 | Lin et al. .................. 420/531 | JP | 2001 073056 A | 3/2001 |
| 2005/0199318 | A1* | 9/2005 | Doty .......................... 148/439 | JP | 2001 226731 | 8/2001 |
| 2005/0224145 | A1* | 10/2005 | Laslaz et al. .............. 148/439 | JP | 2001 335874 | 12/2001 |
| 2005/0238528 | A1 | 10/2005 | Lin et al. | JP | 2002 105611 | 4/2002 |
| 2005/0238529 | A1 | 10/2005 | Lin et al. | JP | 2002 371333 | 12/2002 |
| 2005/0269000 | A1 | 12/2005 | Denzer et al. | WO | WO 96/10099 | 4/1996 |
| 2006/0054666 | A1 | 3/2006 | Ehrstrom et al. | WO | 98/52707 | 11/1998 |
| 2006/0151075 | A1 | 7/2006 | Van Der Veen et al. | WO | WO 98/52707 | 11/1998 |
| 2006/0157172 | A1 | 7/2006 | Fischer et al. | WO | WO 00/26020 | 5/2000 |
| 2006/0174980 | A1 | 8/2006 | Benedictus et al. | WO | WO 2004/003244 | 1/2004 |
| 2006/0182650 | A1 | 8/2006 | Eberl et al. | WO | WO 2004/046402 | 6/2004 |
| 2006/0191609 | A1 | 8/2006 | Dangerfield et al. | WO | WO 2004/090183 | 10/2004 |
| 2006/0289093 | A1 | 12/2006 | Yan et al. | WO | WO 2004/090185 | 10/2004 |
| 2007/0017604 | A1 | 1/2007 | Yan et al. | WO | 2004/111282 A1 | 12/2004 |
| 2007/0029016 | A1 | 2/2007 | Gheorghe | WO | WO 2004/111282 | 12/2004 |
| 2007/0125460 | A1 | 6/2007 | Lin et al. | WO | 2005/010224 A1 | 2/2005 |
| 2007/0151636 | A1 | 7/2007 | Buerger et al. | WO | WO 2005/010224 | 2/2005 |
| 2008/0066833 | A1 | 3/2008 | Lin et al. | WO | 2005/040440 | 5/2005 |
| 2008/0173377 | A1 | 7/2008 | Khosla et al. | WO | WO 2005/040440 | 5/2005 |
| 2008/0173378 | A1 | 7/2008 | Khosla et al. | WO | WO 2005/071127 | 8/2005 |
| 2008/0283163 | A1 | 11/2008 | Bray et al. | WO | WO 2005/071127 A | 8/2005 |
| 2008/0299000 | A1 | 12/2008 | Gheorghe et al. | WO | WO 2005/075692 | 8/2005 |
| 2009/0180920 | A1 | 7/2009 | Reichlinger et al. | WO | WO 2005/075692 A | 8/2005 |
| 2009/0320969 | A1 | 12/2009 | Benedictus et al. | WO | WO 2005/090628 | 9/2005 |
| 2010/0037998 | A1 | 2/2010 | Bray et al. | WO | WO 2006/019946 | 2/2006 |
| 2010/0047113 | A1* | 2/2010 | Lin et al. .................. 420/532 | WO | WO 2006/030123 | 3/2006 |
| | | | | WO | WO 2006/086534 | 8/2006 |
| FOREIGN PATENT DOCUMENTS | | | | WO | WO 2006/127812 | 11/2006 |
| | | | | WO | WO 2007/051162 | 5/2007 |
| EP | 0677779 | | 10/1995 | WO | WO 2007/111634 | 10/2007 |
| EP | 0829552 | | 3/1998 | WO | WO 2008/036760 | 3/2008 |
| EP | 0377779 | | 9/2001 | WO | WO 2008/156532 | 12/2008 |
| EP | 1143027 | | 10/2001 | | | |
| EP | 1143027 A1 | | 10/2001 | | | |
| EP | 1188501 | | 3/2002 | | | |
| EP | 1188501 A1 | | 3/2002 | | | |
| EP | 1 205 567 A | | 5/2002 | | | |
| EP | 1205567 | | 5/2002 | | | |
| EP | 1229141 | | 8/2002 | | | |
| EP | 1229141 A1 | | 8/2002 | | | |
| EP | 1544315 | | 6/2005 | | | |
| EP | 1799391 | | 3/2006 | | | |
| FR | 2078470 | | 10/1971 | | | |
| FR | 2853666 | | 10/2004 | | | |
| FR | 2872172 | | 12/2005 | | | |
| GB | 1217765 | | 12/1970 | | | |
| GB | 1320271 | | 6/1971 | | | |
| GB | 1529305 | | 10/1978 | | | |
| GB | 2366531 | | 3/2002 | | | |
| GB | 2366531 A | | 3/2002 | | | |
| GB | 2402943 | | 12/2004 | | | |
| JP | 48007822 | | 1/1973 | | | |
| JP | 356163234 | | 12/1981 | | | |
| JP | 57079142 | | 5/1982 | | | |
| JP | 58161747 | | 9/1983 | | | |
| JP | 58213852 | | 12/1983 | | | |
| JP | 5928555 | | 2/1984 | | | |
| JP | 60234955 | | 5/1984 | | | |
| JP | 59118865 | | 7/1984 | | | |
| JP | 60145365 | | 7/1985 | | | |
| JP | 60180637 | | 9/1985 | | | |
| JP | 60194041 | | 10/1985 | | | |
| JP | 361139635 | | 6/1986 | | | |
| JP | 62250149 | | 10/1987 | | | |
| JP | 03107440 | | 5/1991 | | | |
| JP | 3122246 | | 5/1991 | | | |
| JP | 3122247 | | 5/1991 | | | |
| JP | 3122248 | | 5/1991 | | | |
| JP | 05295478 | | 11/1993 | | | |
| JP | 06 065666 A | | 3/1994 | | | |

OTHER PUBLICATIONS

Fridlyander, J.N., Advanced Russian Aluminum Alloys, *Proceedings of the 4th International Conference on Aluminium Alloys*, Sep. 11-16, 1994, vol. II, Atlanta, Georgia, 80-87.

Fridlyander, J.N., et al., Development and Application of High-Strength Al-Zn-Mg-Cu Alloys, *Materials Science Forum*, 1996, vol. 217-222, 1813-1818.

Grasso, P.D., et al., Hot Tear Formation and Coalescene Observations in Organic Alloys, JOM-e, Jan. 2002, [online] [retrieved on May 17, 2010] URL: http://www.tms.org/pubs/journals/JOM/0201/Grasso/Grasso-0201.html.

Hatch, J., Aluminum: Properties and Physical Metallurgy, ASM International, 1984, 367-368.

Islam, et al., Retrogression and Reaging Response of 7475 Aluminum Alloy, *Metals Technology*, vol. 10, Oct. 1983, 386-392.

Kaufman, G., et al., Aluminum Alloy Castings: Properties, Processes, and Applications, ASM International, Dec. 2004, 7-8, 10-11.

Rajan, et al., Microstructural Study of a High-Strength Stress-Corrosion Resistant 7075 Aluminum Alloy, *Journal of Materials Science*, 1982, vol. 17, 2817-2824.

Schijve, J., The Significance of Flight-Simulation Fatigue Tests, Delft University Report (LR-466), Jun. 1985.

Shahani, R., et al., High Strength 7XXX Alloys for Ultra-Thick Aerospace Plate: Optimisation of Alloy Composition, *Aluminum Alloys*, Jul. 5-10, 1998, vol. 2, 1105-1110.

Teleshov, et al., Influence of Chemical Compositions on High-and Low-Cycle Fatigue With Zero-Start Extension of Sheets of D16 and V95 Alloys, *Russian Metallurgica*, Moscow, 1983, 141-144.

Tumanov, A.T., Application of Aluminum Alloy, Moscow, *Metalourgia Publishers*, 1973, 181.

Tumanov, A.T., Use of Aluminum Alloys, Moscow, Metalourgia Publishers, 1973, 131-133, 139.

Wallace, W., A New Approach to the Problem of Stress Corrosion Cracking in 7075-T6 Aluminum, *Canadian Aeronautics & Space Journal*, 1981, 27(3), 222-232.

Warner, T.J., et al., Aluminum Alloy Development for Affordable Airframe Structures, Third ASM International Paris Convention on Synthesis, *Processing and Modeling of Advanced Materials*, 1997, 79-88.

ASM Handbook vol. 15 Casting, ASM International, 1988, 327, 332-334, 743-746, 754, 757-759, 767.

ASM vol. 4 Heat Treating, ASM International, 1991, 850.

Aluminum and Aluminum Alloys, ASM International, 1993, 26, 41, 91-93, 104, 718-721.

Chemical Composition Limits, Aluminum Association Teal Sheets, 2009, 10-12.

Chemical Composition Limits, Aluminum Association Pink Sheets, date unknown, 7.

International Alloy Designations and Chemical Compositions Limits for Wrought Aluminum and Wrought Aluminum Alloys, Registration Record Series, Aluminum Association, Washington DC, Jan. 1, 2004, 1-26.

Metals Handbook: Desk Edition, $2^{nd}$ Edition, ASM International, 1998, 419-422, 445-460.

* cited by examiner

Composition C T5 Temper   TYS=144 MPa, CFS= 7 %

Composition C T5 Temper   TYS 110 MPa, CFS= 10 %
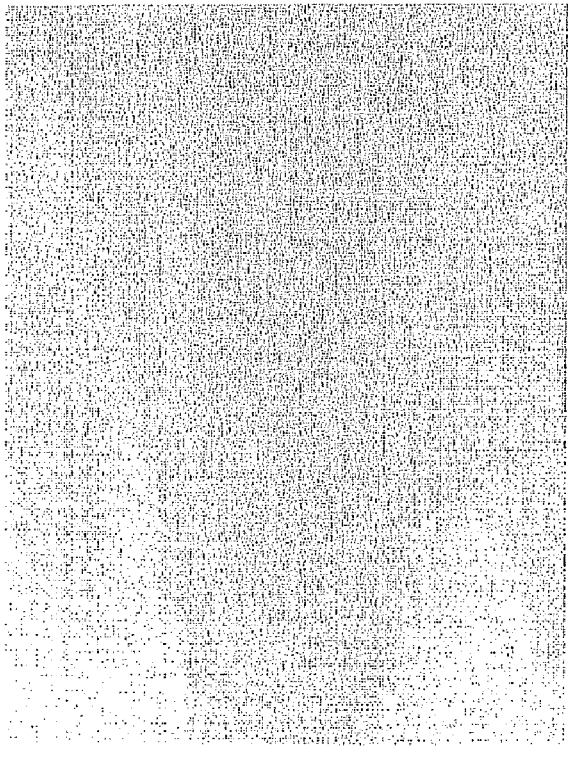
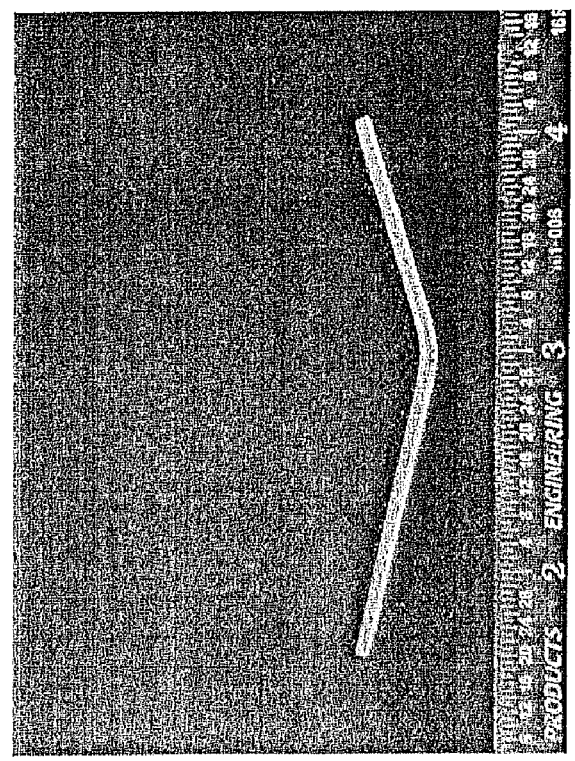
FIGURE 3C
FIGURE 3D Composition C T6 Temper  TYS=135 MPa, CFS=24%

Composition C T6 Temper   TYS=180 MPa, CFS= 9 %

HIGH CRASHWORTHINESS AL-SI-MG ALLOY AND METHODS FOR PRODUCING AUTOMOTIVE CASTING

CROSS REFERENCE TO RELATED APPLICATION

The present invention claims the benefit of U.S. provisional patent application 60/731,046, filed Oct. 28, 2005, the whole contents and disclosure of which is incorporated by reference as is fully set forth herein.

FIELD OF THE INVENTION

The present invention relates to aluminum casting alloys that are suitable for automotive applications. Specifically, the present invention relates to Al—Si—Mg casting alloys having a crash performance that is suitable for automotive applications.

BACKGROUND OF THE INVENTION

Aluminum alloys are highly desirable for vehicle frame construction because they offer low density, good strength and corrosion resistance. Moreover, aluminum alloys can be employed to improve vehicle frame stiffness and performance characteristics. Moreover, it is believed that an aluminum vehicle frame retains the strength and crashworthiness that is typically associated with much heavier, conventional steel frame vehicle designs.

An important consideration for aluminum automotive body structures includes crashworthiness in conjunction with reducing the overall vehicle weight and/or improving vehicle performance. For the automotive applications, crashworthiness reflects the ability of a vehicle to sustain some amount of collision impact without incurring unacceptable distortion of the passenger compartment or undue deceleration of the occupants. Upon impact, the structure should deform in a prescribed manner; the energy of deformation absorbed by the structure should balance the kinetic energy of impact; the integrity of the passenger compartment should be maintained; and the primary structure should crush in such a manner as to minimize the occupant deceleration.

The demand for higher crash performance of automotive aluminum cast components has greatly increased, particularly with respect to body structures, including but not limited to: brackets, nodes (e.g. A-Post, B-Post, C-Post, etc.), crashboxes, crossmembers, subframes, and engine cradles, etc. However, the most common aluminum cast alloy, A356 has poor crushability even in T6 temper. One characterization of crashworthiness is critical fracture strain (CFS) as developed by Yeh. See J. R. Yeh, "The Development of an Aluminum Failure Model for Crashworthiness Design", Report No. 99-016, 1999-03-11. The critical fracture strain (CFS) or A356-T6 is approximately 5-6%. Typically, the critical fracture strain (CFS) required for a crash sensitive components and applications is on the order of 10% or greater.

Therefore, a new alloy and heat treatment are needed for producing cast components with a balanced strength and crashworthiness.

SUMMARY OF THE INVENTION

The present invention provides an Al—Si—Mg base alloy suitable for gravity or low pressure permanent mold, high pressure die casting, or sand mold casting, having a tensile strength and critical fracture strain (CFS) suitable for automotive applications, including but not limited to frame components.

In one embodiment, the invention comprises of an inventive Al—Si—Mg base alloy for gravity or low pressure permanent mold, high pressure die casting, sand mold casting or like casting processes, wherein a casting produced by the inventive Al—Si—Mg alloy is suitable for F, T5 or T6 tempers in achieving a yield strength ranging from approximately 100 MPa to approximately 180 MPa, an elongation ranging from 10% to 20%, and a critical fracture strain (CFS) of at least 10%. Broadly, the composition of the Al—Si—Mg alloy of the present invention consists essentially of:

about 6.0 wt % to about 8.0 wt % Si;
about 0.12 wt % to about 0.25 wt % Mg;
less than or equal to about 0.35 wt % Cu;
less than or equal to about 4.0 wt % Zn;
less than or equal to about 0.6 wt % Mn;
less than or equal to about 0.15 wt % Fe; and
a balance of aluminum and impurities.

In one embodiment of the present invention, an Al—Si—Mg alloy is provided for Vacuum Riserless Casting (VRC)/Pressure Riserless Casting (PRC), permanent mold or sand mold casting comprising from about 6.5 wt % to about 7.5 wt % Si; from about 0.12 wt % to about 0.20 wt % Mg; less than about 0.15 wt % Mn, preferably being less than about 0.05 wt % Mn; and less than about 0.10 wt % Fe, wherein the balance comprises Al and impurities.

In another embodiment of the present invention, an Al—Si—Mg alloy is provided for high pressure die casting or Alcoa Vacuum Die Casting (AVDC) and comprises from about 6.5 wt % to about 7.5 wt % Si; from about 0.12 wt % to about 0.20 wt % Mg; from about 0.5 wt % to about 0.6 wt % Mn; and Fe less than 0.10 wt %, wherein the balance comprises Al and impurities. The increased Mn content reduces soldering of the mold during the casting process, wherein the Mn content reduces the tendency of the casting to stick to the mold.

In one preferred embodiment, the Si content ranges from 6.5 wt. % to 7.5 wt. % and the Mg content ranges from about 0.12 wt. % to about 0.19 wt. %.

In another aspect of the present invention, a process incorporating the inventive Al—Si—Mg alloy composition produces a casting having a tensile strength comparable to A356 and having a critical fracture strain (CFS) greater than A356, when cast and treated to a T5 or T6 temper. A356 typically has a composition of Al-7Si-0.35Mg, and when heat treated to a T5 or T6 temper has a tensile yield strength (TYS) ranging from 190 MPa to 240 MPa and a critical fracture strain (CFS) ranging from 5% to 6%.

This alloy heat treatment of the inventive process depends on the range of performance targeted, and covers natural aging, T4, T5, T6 and T7.

The casting complexity allows the shape of the product to reach the stiffness target performance that is comparable to or higher than that of existing steel design.

BRIEF DESCRIPTION OF THE DRAWINGS

FIGS. 3a-3d pictorially represent bend test specimens treated to T5 temper.

DETAILED DESCRIPTION OF PREFERRED EMBODIMENTS

The present invention provides a casting alloy composition having a balanced strength and crashworthiness for automotive castings. Broadly, the inventive casting alloy comprises:
 6.0 wt %-8.0 wt % Si,
 0.12 wt %-0.25 wt % Mg,
 less than 0.35 wt % Cu,
 less than 4.0 wt % Zn,
 less than 0.6 wt % Mn,
 less than 0.15 wt % Fe,
 at least one silicon modifier,
 at least one grain refining element, and
 a balance of aluminum and impurities.

All component percentages herein are by weight percent (wt %) unless otherwise indicated. When referring to any numerical range of values, such ranges are understood to include each and every number and/or fraction between the stated range minimum and maximum. A range of about 6.0 wt %-8.0 wt % Si, for example, would expressly include all intermediate values of about 6.1, 6.2 and 6.3 wt %, all the way up to and including, 8.0 wt % Si. The term "impurities" denotes any contamination of the melt, including leaching of elements from the casting apparatus. Allowable ranges of impurities are less than 0.05 wt % for each impurity constituent and 0.15 wt % for total impurity content.

The aluminum casting alloy of the present invention has a Mg concentration that increases critical fracture strain (CFS) in the presence of excess silicon. Although silicon increases castability by promoting high fluidity and low shrinkage in the cast alloy, increased silicon content results in the formation of silicon particles resulting in a casted body having low crashworthiness. In one embodiment, the Mg concentration of the present invention is selected to produce the proper proportion of $Mg_2Si$ precipitates in the metal solution, without excessive precipitate formation at the grain boundaries, in providing a casting alloy that when subjected to precipitate hardening results in a tensile strength suitable for automotive applications and a critical fracture strain (CFS) greater than or equal to 10%.

The critical fracture strain (CFS) is one value used to characterize crashworthiness. The CFS may be derived from an engineering stress v. strain curve that is generated from a sample of an alloy being tested. The stress v. strain curve may be determined using quasi-static free bend testing (ASTME190), quasi-static crush testing, quasi-static axial crush, or quasi-static three-point bend.

Figure 1:
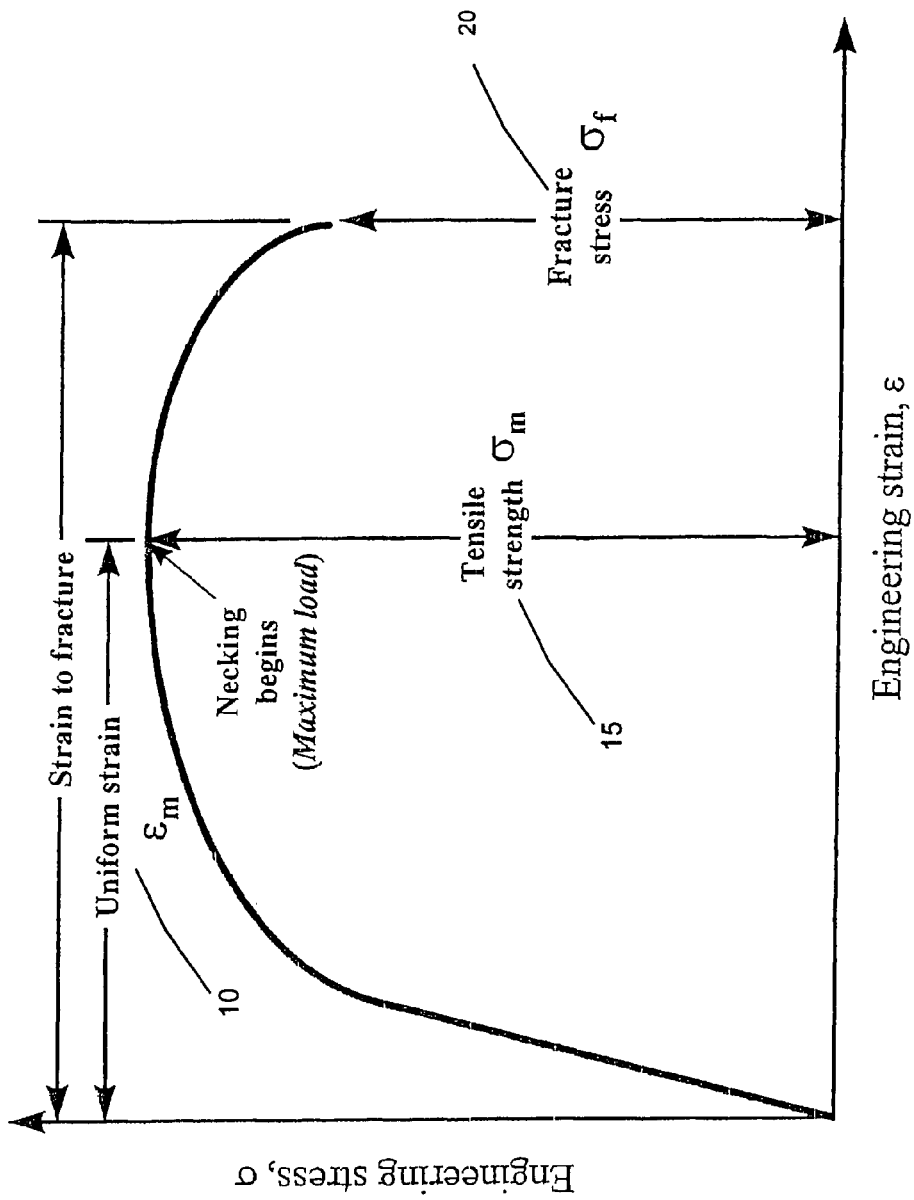
FIG. 1 depicts a stress v. strain curve.

Using a stress v. strain curve, as depicted in FIG. 1, the engineering strain at maximum load ($\epsilon_m$) 10, the engineering stress at maximum load ($\delta_m$) 15 and the engineering stress at the fracture load ($\delta_f$) 20 may be determined and then entered into the following equation to provide the engineering thinning strain ($\epsilon_{l,eng}$):

$$\epsilon_{l,eng} = \epsilon_m/2 + (1-(\epsilon_m/2)) \times (1-(\delta_f/\delta_m))$$

The engineering thinning strain ($\epsilon_{l,eng}$) is then used to derive the critical fracture strain (CFS) through the following equation:

$$CFS = -\ln(1-\epsilon_{l,eng})$$

Generally, materials having a high CFS value perform better under large deformation than materials having a low CFS value. Typically, prior materials and alloy compositions encounter severe cracking during crush testing when characterized by a CFS value lower than 10%.

In one embodiment, the inventive crashworthy alloy composition comprises of an Al—Si—Mg base alloy for gravity or low pressure permanent mold, or sand mold casting with the following composition ranges (all in weight percent):
 6.0 wt % to 8.0 wt % Si,
 0.12 wt % to 0.25 wt % Mg,
 less than 0.35 wt % Cu,
 less than 4.0 wt % Zn,
 less than 0.6 wt % Mn, and
 less than 0.15 wt % Fe.

In another embodiment, the inventive crashworthy alloy composition comprises of an Al—Si—Mg alloy for high pressure die casting, wherein the manganese wt % may be increased to 0.55 for preventing die soldering, in which the increased manganese content decreases the likelihood that the alloy sticks to the mold during the casting process.

The Cu level of the casting alloy may be increased to increase the alloy's strength performance. But, increasing the Cu content to greater than 0.35 wt % may have a disadvantageous effect on ductility. The Zn content may be increased to reduce the alloy's sensitivity to solidification rate. It may be particularly useful to increase the Zn content for casting applications of greater thicknesses, where the solidification rate significantly differs from the center most portion of the casting in comparison to the portions of the casting that are in direct contact with the mold surface.

The inventive alloy composition may further include Si modifiers and grain refiners. In one example, a Si modifier may be included in the above alloy composition in an amount less than or equal to 0.02 wt %, wherein the Si modifier is selected from the group consisting of Ca, Na, Sr, and Sb. In one example, grain refiners may include titanium diboride, $TiB_2$ or titanium carbide, TiC. If titanium diboride is employed as a grain refiner, the concentration of boron in the alloy may be in a range from 0.0025 wt. % to 0.05 wt. %. Likewise, if titanium carbide is employed as a grain refiner, the concentration of carbon in the alloy may be in the range from 0.0025 wt. % to 0.05 wt. %. Typical grain refiners are aluminum alloys containing TiC or $TiB_2$.

One aspect of the present invention, is a process for forming a casting from the above alloy composition, including a specified heat treatment. This alloy heat treatment depends on the range and type of performance targeted, and covers natural aging, T4, T5, T6 and T7 temper. In one embodiment, a T5 heat treatment typically includes an artificial aging treatment at a temperature of about 150° C. to 250° C. for a time period ranging from a ½ hour to 10 hours.

Typically, a T6 treatment includes a three stage treatment beginning with a solution heat treatment of 450° C. to 550° C. for a time period ranging from approximately ½ hour to approximately 6 hours. Following solution heat treatment, a quench process is conducted using air quench, forced air quench, liquid mist quench or liquid submersion quench. It is noted that the quench rate may be increased, so long as the casting is not distorted or residual stresses are not induced into the casting surface, or the quench rate may be decreased, so long as the percentage of precipitating elements remaining in the supersaturated solution is not so adversely affected to substantially reduce the casting's strength. Following quench, the casting is then artificially aged to peak strength, wherein the aging process is similar to that used in processing to T5 temper.

A T4 treatment typically includes a three stage treatment similar to T6, but in the final stage of the T4 treatment the casting is naturally aged, whereas in T6 heat treatments the casting is artificially aged at an elevated temperature. More specifically, the first stage of the T4 treatment is preferably a solution heat treatment of 450° C. to 550° C. for a time period ranging from approximately ½ hour to approximately 6 hours. Following solution heat treatment, a quench process is conducted using air quench, forced air quench, liquid mist quench or liquid submersion quench. Following quench, the casting is then naturally aged.

The T7 heat treatment is similar to T6 and also comprises solution heat treatment, quench and aging process steps. Opposed to T6 temper in which the artificial aging step is conducted to peak strength, the aging process step of the T7 heat treatment continues until averaging, wherein in some embodiments averaging of the castings while having a negative effect on strength advantageously increases corrosion resistance.

The casting complexity allows the shape of the product to reach a stiffness target performance that is comparable or higher than that of existing steel design.

The combination of the targeted Al—Si—Mg alloy and the manufacturing process provide castings suitable for crash applications.

In one embodiment, Vacuum Riserless Casting/Pressure Riserless Casting (VRC/PRC) of the present alloy provides very flexible process parameters that permit casting of any part, wherein the cast parts may have a wall thickness of 3 mm or higher, in which the castings may be solid or hollow.

The Vacuum Riserless Casting (VRC)/Pressure Riserless Casting (PRC) process is suitable for mass production of high integrity aluminum automotive chassis and suspension components. VRC/PRC is a low pressure casting process, in which in some embodiments the pressure may be on the order of 6.0 Psi. In VRC/PRC, a mold is positioned over a hermetically sealed furnace and the casting cavity is connected to the melt by feed tubes(s). Melt is drawn into the mold cavity by applying a pressure to the furnace through the application of an inert gas, such as Ar. A constant melt level is maintained in the furnace of the VRC/PRC apparatus, avoiding back-surges that are sometimes experienced in the more traditional low pressure system.

Multiple fill tubes (stalks) provide ideal metal distribution in the mold cavity. Multiple fill points combined with close coupling between the mold and melt surface allows lower metal temperatures, minimizes hydrogen and oxide contamination and provides maximum feeding of shrinkage-prone areas in the casting. The multiple fill tubes also allow multiple yet independent cavities in a mold. Carefully sequenced thermal controls quickly solidify castings from extreme back to fill tubes, which then function as feed risers.

In another embodiment of the present invention, the alloy may be utilized in die casting applications, preferably being high pressure die casting, such as Alcoa Vacuum Die Casting (AVDC). A more detailed discussion of AVDC is described in U.S. Pat. No. 5,246,055, titled "Vacuum Die-Casting Machine with Apparatus and Method for Controlling Pressure Behind the Piston", which is incorporated in its entirety by reference.

Die casting is a process in which molten metal is injected at high velocity and pressure into a mold (die) cavity preferably made of high-quality steel. Under ideal conditions the metal does not solidify before the cavity is filled.

Alcoa Vacuum Die Casting (AVDC) is a form of high pressure die casting, wherein AVDC preferably evacuates the entire die cavity and shot system as it draws melt under vacuum into the shot tube and then injects it under high pressure into the die. AVDC substantially reduces, preferably eliminating, the atmosphere in the shot systems and die cavity. To accomplish this, the shot and die cavity system are preferably well sealed to avoid drawing in ambient air when under high vacuum. In comparison to typical die casting, AVDC produces a vacuum at least one order of magnitude greater than the highers vacuum that can possibly be provided by typical die casting. If the atmosphere in the shot system and die cavity are essentially eliminated there can be little to no air available to be admixed and entrapped in the molten metal during cavity fill.

In comparison to low pressure Vacuum Riserless Casting (VRC)/Pressure Riserless Casting (PRC) providing a pressure on the order of 6 Psi, AVDC produces a high pressure that is orders of magnitude greater than the pressure produced by VRC/PRC casting operations, whereas in some embodiments AVDC provides a pressure on the order of 10 Ksi or greater.

In one embodiment, the alloy of the present invention when utilized in VRC/PRC castings unexpectable provides comparable bending performance to castings formed by high pressure die castings, such as AVDC castings, whereas an observable advantage in bending performance is typically present in alloys cast by high pressure die castings when compared to castings prepared by VRC/PRC.

AVDC typically provides a higher solidification rate than VRC/PRC, and therefore results in castings having a smaller grain size, smaller particle size and smaller dendritic spacing, which all contribute to greater ductility and greater bending performance. Comparable bending performance in castings formed using VRC/PRC casting technology can be unexpectedly obtained, by utilizing the casting alloy of the present invention, in which the Mg content has been tailored to reduce $Mg_2Si$ particle formation, in combination with reducing the thickness of the castings by utilizing sand cores to provide wall thicknesses of less than 6 mm, preferably being 4.0 mm, and being as thin as 2.0 mm, so long as castability is not adversely affected.

The following examples are provided to further illustrate the present invention and demonstrate some advantages that arise therefrom. It is not intended that the invention be limited to the specific examples disclosed.

Example I

Critical Fracture Strain

Castings representing three alloy compositions within the inventive alloy composition were prepared from direction solidification molds and permanent molds. One example of permanent mold systems includes Vacuum Riserless Casting/Pressure Riserless Casting. The composition of each alloy sample tested are provided in Table I, in which sample A was prepared on a laboratory scale from a directional solidification mold and samples B and C were prepared on a production scale from Vacuum Riserless Casting/Pressure Riserless Casting molds utilizing a sand core to provide a hollow casting having a wall thickness on the order of approximately 4 mm.

TABLE I

Compositions of the alloy

| Alloy composition | Si | Mg | Cu | Zn | Fe |
|---|---|---|---|---|---|
| A | 7.05 | 0.1 | 0 | 2.57 | 0.02 |
| B | 7.03 | 0.16 | 0.35 | 0 | 0.06 |
| C | 7.01 | 0.177 | 0 | 0.0025 | 0.087 |

Following casting the samples where then air cooled. Regardless of the casting process, the solidification rates of the cast structures from the directionally solidified molds and the permanent molds were substantially equal. The cast structures where then heat treated to F, T5 or T6 temper. T5 heat treatment comprised artificial aging at a temperature of about 150° C. to 250° C. for a time period ranging from a ½ hour to 10 hours. T6 treatment comprised a solution heat treatment of 450° C. to 550° C. for a time period ranging from approximately ½ hour to approximately 6 hours, liquid quench, and artificial aging at a temperature of 150° C. to 250° C. for a time period ranging from a ½ hour to 10 hours. Following heat treatment the casting where then machined into test samples and subjected to tensile testing in accordance with ASTM B557. (See ASTM B557: Tension testing wrought and cast aluminum and magnesium alloy products). The ultimate tensile strength, yield tensile strength, and elongation of the alloys listed in Table I were then recorded. A stress-strain curve was provided for each alloy listed in Table I, from which the critical fracture strain (CFS) was determined. The critical fracture strength (CFS), ultimate fractures strength (UTS), tensile yield strength (TYS), and Elongation was then recorded in Table II.

TABLE II

Tensile properties and CFS of the alloy

| Alloy | Test Scale | Temper | TYS (MPa) | UTS (MPa) | E (%) | CFS (%) |
|---|---|---|---|---|---|---|
| A | Lab | T5 | 122 | 204 | 18 | — |
| B | Lab | T5 | 150 | 232 | 10 | — |
| C | Plant | F | 90 | 200 | 14 | — |
| C | Plant | T5 | 144 | 218 | 10 | 7 |
| C | Plant | T5 | 110 | 190 | 14 | 10 |
| C | Plant | T6 | 166 | 256 | 14 | 14 |
| C | Plant | T6 | 135 | 227 | 16 | 24 |
| C | Plant | T6 | 180 | 270 | 10 | 9 |

The results indicate that an adequate combination of strength and crashworthiness can be achieved in Al—Si—Mg alloys for automotive applications by controlling the alloy composition and heat treatment. High ductility and high critical fracture strain are generally observed in the invented alloy. Both T5 and T6 tempers increase the strength of the alloy. However, the decrease of ductility and critical fracture toughness observed with increasing strength is slower in T6 temper when compared to T5 temper.

Example II

Visual Inspection for Cracking in Bend Testing

VRC/PRC castings were then prepared using alloy composition C, as listed in Table I, treated to T5 and T6 temper, and then subjected to bend testing and visual inspection for cracking. The castings were prepared from (VRC)/(PRC) casting technology as described above using a sand core to provide a wall thickness on the order of approximately 4.0 mm. The temperature for the T5 and T6 heat treatments was similar to the description of the heat treatments described in Example 1. The time period for heat treatment was varied to test the bending performance for varying strengths of the specified alloys. Table III illustrates the casting samples and heat treatments.

TABLE III

Compositions of the Alloy and Temper

| Sample | Test Scale | Temper | TYS (MPa) | CFS (%) |
|---|---|---|---|---|
| 1 | Plant | T5 | 144 | 7 |
| 2 | Plant | T5 | 110 | 10 |
| 3 | Plant | T6 | 135 | 24 |
| 4 | Plant | T6 | 180 | 9 |

Samples 1 and 2 were treated to T5 temper, in which the aging time of sample 1 was greater than the aging time of sample 2. Samples 3 and 4 were treated to a T6 temper, in which the aging time of sample 4 was greater than the aging time of sample 3.

Following heat treatment, the samples were machined into test plates 30a, 30b having a length of approximately 60 mm, a width of approximately 30 mm, and a thickness on the order of approximately 2 mm.

The Tensile Yield Strength (TYS) and the Critical Fracture Strength (CFS) were measured in accordance with the method discussed in Example 1, and are listed here for comparative purposes with respect to the visual bend test.

Figure 2:
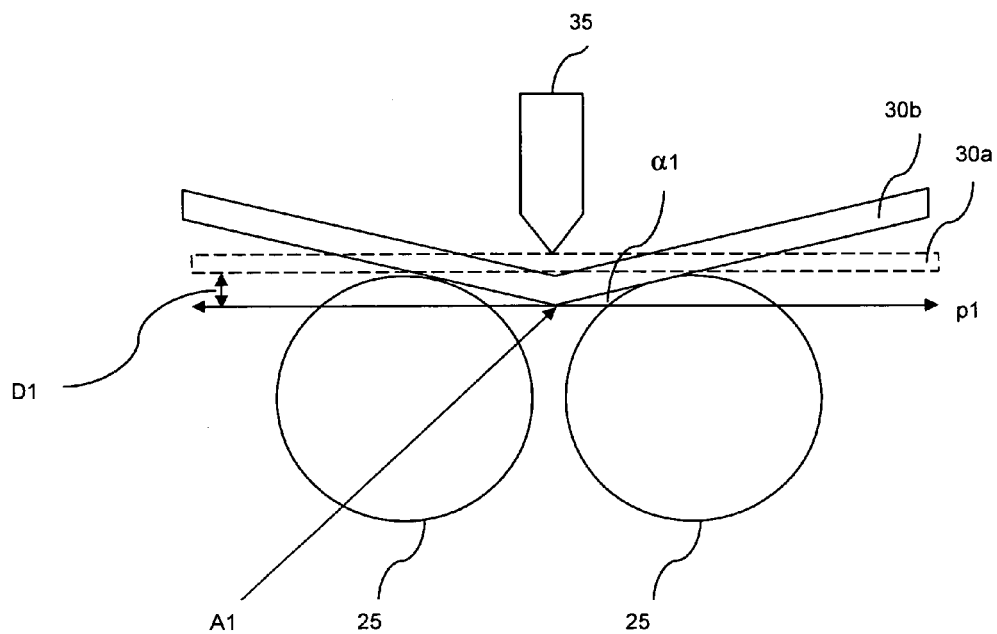
FIG. 2 (side view) depicts a three point bending test.

Referring to FIG. 2, the bend test was similar to three point bend testing, in which the base points 25 have a cylindrical geometry and the loading nose 35 has a wedge geometry. During actuation the loading wedge contacts the centerline of the test plate 30a, 30b (the test plate prior to deformation is designated by reference number 30a, the test plate following deformation is designated by reference number 30b) deforming the test plate 30a, 30b against the base points. The deformation of the test plate 30a, 30b continues until angle α1 of approximately 15° is formed at the apex A1 of displacement D1 of the deformed plate 30b relative to a plane p1 passing through the apex A1 and being parallel to the plate 30a prior to deformation.

Following bend testing the samples were visually inspected for cracking. The incidence of cracking indicates a sample that is less suitable for crash applications than a sample that does not display cracking.

Figure 3B:
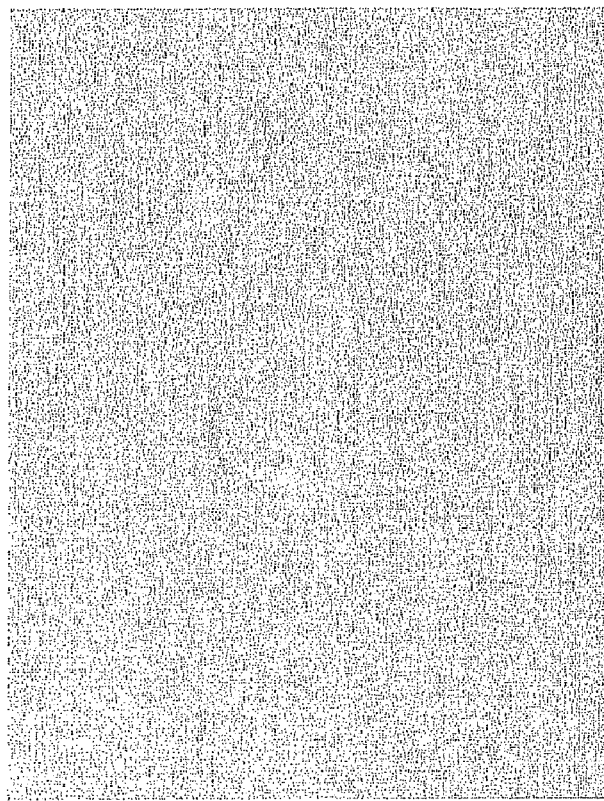
Figure 3A:
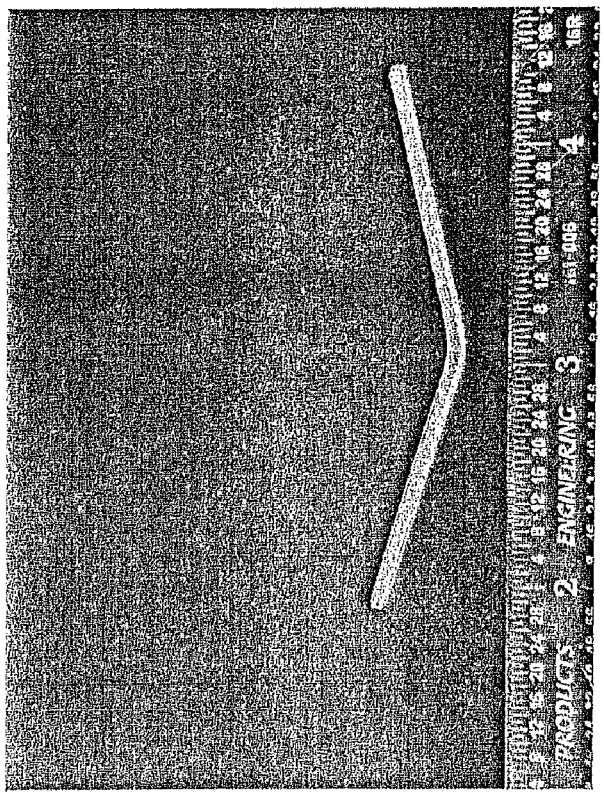

Referring to FIGS. 3a and 3b, pictorial representations are provided for Sample 1, in which the test plate was deformed to an angle of 15° with visual cracking on the bending surface. Specifically, Sample 1 comprised alloy composition C at T5 temper with an aging time to provide a TYS on the order of 144 MPa.

Referring to FIGS. 3c and 3d, pictorial representations are provided for Sample 2, in which the test plate was deformed to an angle of 15° without substantial visual cracking on the bending surface. Specifically, Sample 2 comprised alloy composition C at T5 temper with an aging time to provide a TYS on the order of 110 MPa, wherein the aging time used to prepare Sample 2 is lesser than the aging time of Sample 1. Comparing Samples 1 and 2 indicates that increasing aging time, while increasing TYS, also increases the incidence of cracking resulting in decreased crashworthiness.

Figure 4B:
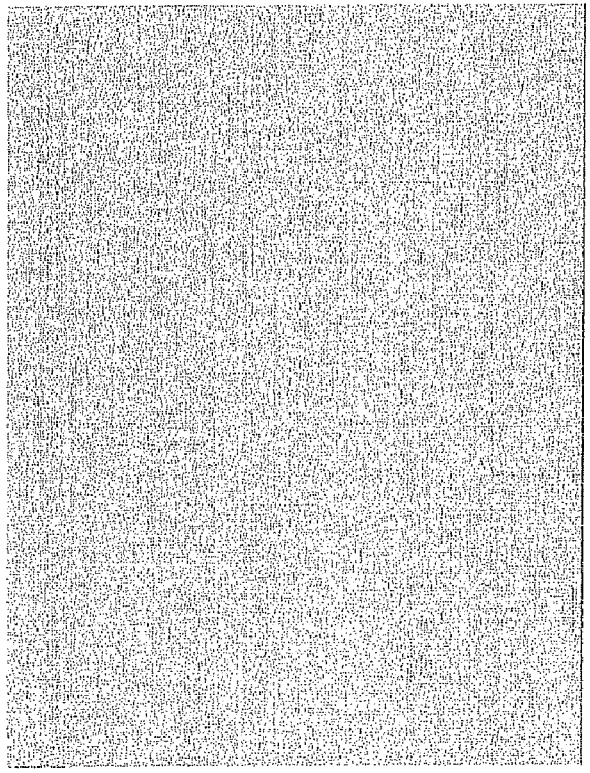
FIGS. 4a-4d pictorially represent bend test specimens treated to T6 temper.
Figure 4A:
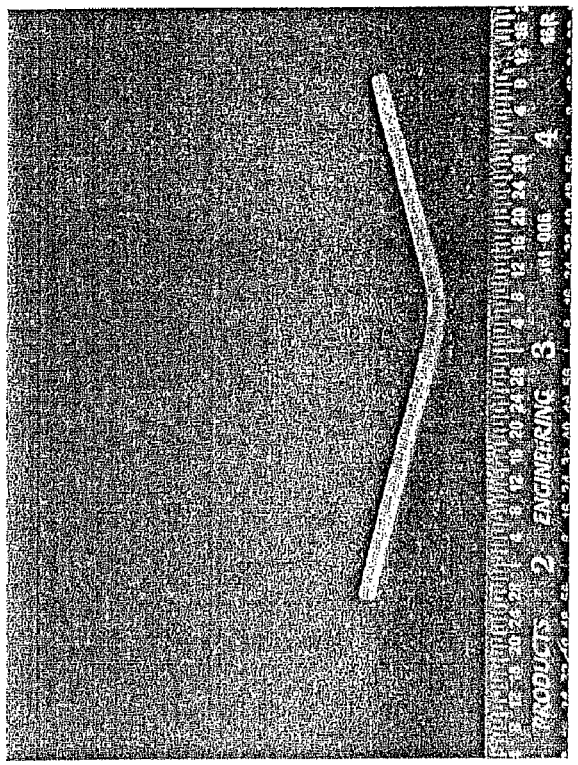

Referring to FIGS. 4a and 4b, pictorial representations are provided for Sample 3, in which the test plate was deformed to an angle of 15° without substantial visual cracking on the bending surface. Specifically, Sample 3 comprised alloy composition C at T6 temper with an aging time to provide a TYS on the order of 135 MPa.

Figure 4D:
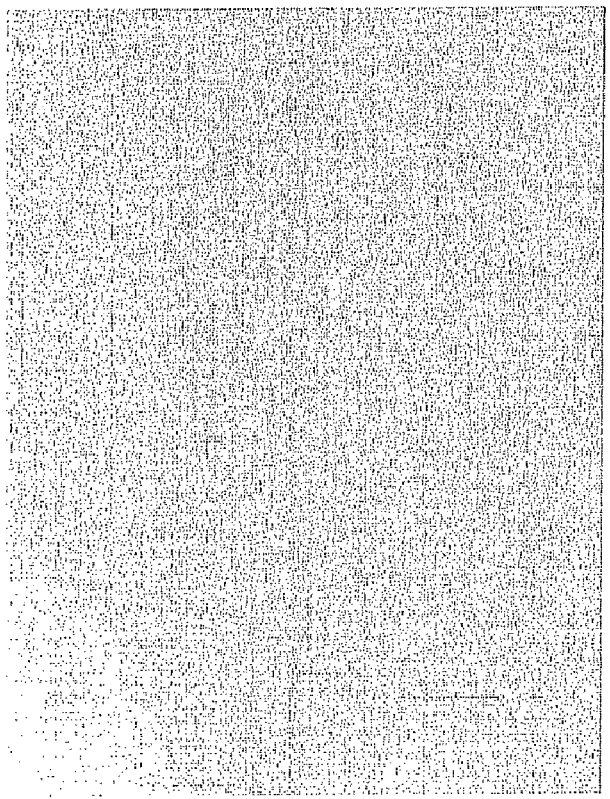
Figure 4C:
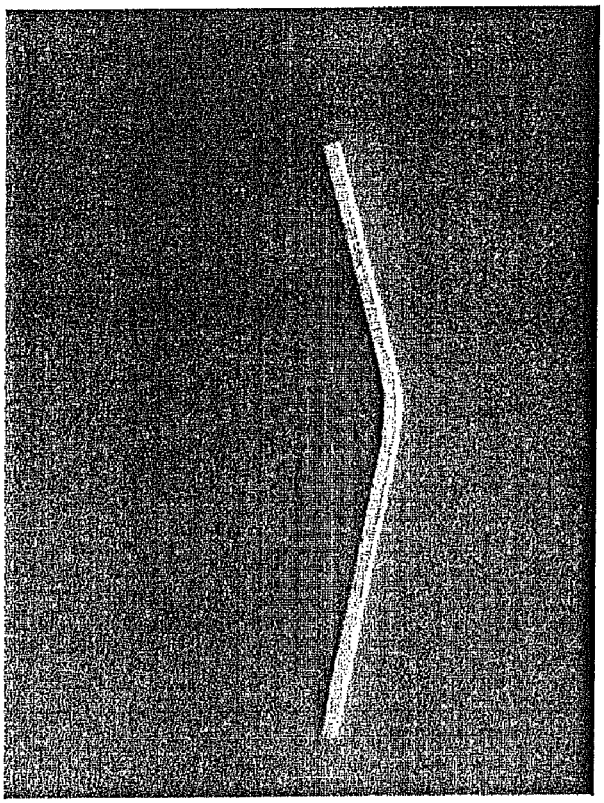

Referring to FIGS. 4c and 4d, pictorial representations are provided for Sample 4, in which the test plate was deformed to an angle of 15° with visual cracking on the bending surface. Specifically, Sample 4 comprised alloy composition C at T6 temper with an aging time to provide a TYS on the order of 180 MPa, wherein the aging time used to prepare Sample 4 is greater than the aging time used to prepare Sample 3. Comparing Samples 3 and 4 indicates that increasing aging time, while increasing TYS, decreases crashworthiness.

It is further noted that a correlation exists between cracking during bend test and critical fracture strains less than 10%. Specifically, with reference to Table III, FIGS. 3a-3d and FIGS. 4a-4d, it is noted that visual cracking is noted in bend tests for alloys and heat treatments characterized by a critical fracture strain less than 10%, such as samples 1 and 4.

Example III

Bending Performance Comparison of High Pressure Die Casting and Vacuum Riserless Casting (VRC)/Pressure Riserless Casting (PRC)

Test samples representing the inventive alloy composition were prepared using Vacuum Riserless Casting/Pressure Riserless Casting and High Pressure Die Casting. The test samples were heat treated, machined into test plates 30a, 30b, and subjected to bend testing. The alloy composition was composed of approximately 9.0-10.0 wt % Si, approximately 0.2 wt % Mg, approximately 0.5-0.6 wt % Mn, and a balance of aluminum and impurities.

VRC/PRC test samples were cast using a sand core to provide a wall thickness on the order of approximately 4.0 mm. Die cast test samples had a thickness on the order of approximately 2.5 mm.

The test samples formed using VRC/PRC casting processes where heat treated to T6 temper. T6 treatment comprised a solution heat treatment of 450° C. to 550° C. for a time period ranging from approximately ½ hour to approximately 6 hours, liquid quench, and artificial aging at a temperature of 150° C. to 250° C. for a time period ranging from a ½ hour to 10 hours.

The test samples formed using high pressure die casting, were also heat treated to peak strength including slightly higher aging temperatures of about 250° C. to 300° C. Following heat treatment the test samples were machined into test plates 30a, 30b having a thickness on the order of approximately 2.0 mm.

A bend test was conducted on the VRC/PRC castings and the high pressure die castings. Referring to FIG. 2, the bend test is similar to three point bend test, in which the base points 25 have a cylindrical geometry and the loading nose 35 has a wedge geometry. During actuation the loading nose 35 contacts the centerline of the test plate 30a, 30b deforming the test plate 30a, 30b against the base points. The deformation of the test plate 30a, 30b continues until the incidence of cracking was visually confirmed. The force applied to the casting and the angle of bending at the incidence of cracking.

The force applied to the casting is the force applied through the loading nose 35. Referring to FIG. 2, the failure angle is the angle a1 at which cracking was visually verified. The failure angle a1 is measured from the apex A1 of displacement D1 of the deformed plate 30b relative to the plane p1 passing through the apex A1 and being parallel to the plate 30a prior to deformation. The failure angle a1 and force for the VRC/PRC castings and the high pressure die castings formed of the alloy of the present invention is recorded in Table IV.

TABLE IV

COMPARISON OF HIGH PRESSURE DIE CASTING AND VRC/PRC BENDING PERFORMANCE

| Sample | Force (N) | Failure Angle | Casting Method |
|---|---|---|---|
| 1 | 1386 | 44 | VRC/PRC |
| 2 | 1369 | 46 | VRC/PRC |
| 3 | 986 | 52 | VRC/PRC |
| 4 | 895 | 51 | VRC/PRC |
| 5 | 1018 | 53 | High Pressure Die Casting |
| 6 | 1044 | 54 | High Pressure Die Casting |
| 7 | 1039 | 50 | High Pressure Die Casting |
| 8 | 1039 | 53 | High Pressure Die Casting |
| 9 | 1059 | 53 | High Pressure Die Casting |
| 10 | 882 | 45 | High Pressure Die Casting |
| 11 | 813 | 40 | High Pressure Die Casting |
| 12 | 1008 | 51 | High Pressure Die Casting |
| 13 | 928 | 48 | High Pressure Die Casting |
| 14 | 940 | 47 | High Pressure Die Casting |

As indicated in Table IV, the bending performance of VRC/PRC casting was comparable to the bending performance of high pressure die castings. Specifically, VRC/PRC castings (samples #1-4) were recorded having an angle failure of 44 to 52°, and high pressure die castings (samples #6-14) were recorded having an angle failure of 40 to 54°.

Figure 5:
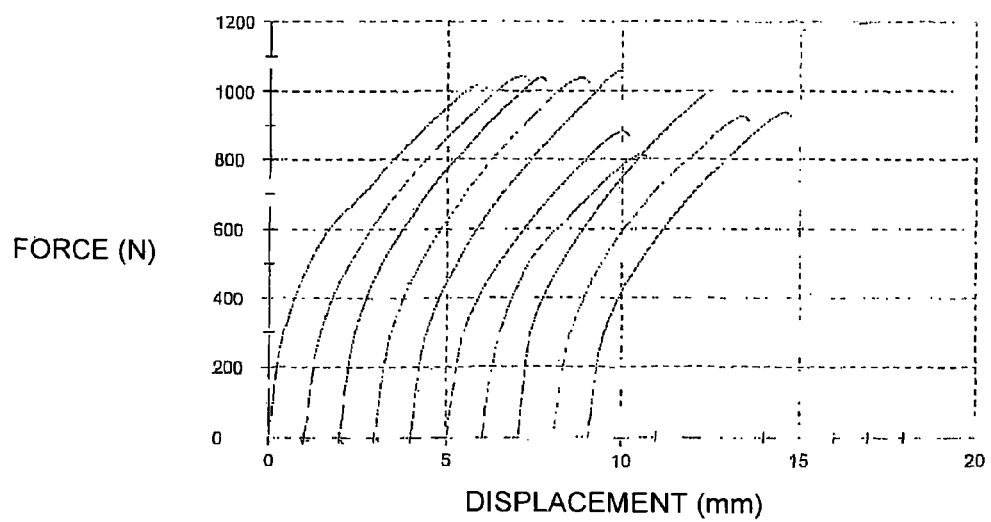
FIG. 5 depicts a plot of the bending performance of high pressure die castings composed of an aluminum alloy within the scope of the present invention.

FIG. 5 depicts a plot graphically representing the bending performance of the high pressure die casting samples recorded in Table IV (sample #'s 6-14), wherein the y-axis depicts the force (N) applied through the loading nose 35, and the displacement (mm) represents the displacement at the apex of the plate 30b resulting from the force of the loading nose. Each plotted data line represents a test sample, wherein the data lines have been shifted along the x-axis for clarity. The area above each curve represents the force and displacement that results in visual cracking during bending and the area below each curve represents the force and displacement that does not result in visual cracking.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. An Al—Si—Mg alloy composition used to produce a cast product having a critical fracture strain of at least about 10%, the alloy comprising:
   about 6.0 wt % to about 7.8 wt % Si;
   about 0.10 wt % to about 0.18 wt % Mg;
   less than or equal to about 0.35 wt % Cu;
   less than or equal to about 0.6 wt % Mn;
   less than or equal to about 0.15 wt % Fe;
   and a balance of aluminum and impurities; wherein, the composition is capable of producing a cast product having a critical fracture strain of at least about 10% and a tensile yield strength of at least 100 MPa when the composition undergoes a heat treating process that includes solution heating, quenching, and aging at aging times of less than about 10 hours.

2. The alloy of claim 1, further comprising at least one silicon modifier in an amount less than or equal to 0.02 wt %, wherein the modifier comprises Ca, Na, Sr, Sb or a combination thereof.

3. The alloy of claim 1, further comprising a grain refiner in an amount less than or equal to 0.1 wt %, wherein said at least one grain refiner comprises $TiB_2$ or TiC.

4. The alloy of claim 1, wherein the Mn content is less than about 0.05 wt % Mn.

5. The alloy of claim 1, wherein the critical fracture strain of the heat treated alloy composition exceeds 10%, the yield tensile strength exceeds 100 MPa, and the heat treatment process comprises T6 or T7 to further provide an elongation that exceeds 14%.

6. The alloy of claim 1 having about 7.0 wt % Si and from about 0.10 wt % to about 0.18 wt % Mg.

7. The alloy of claim 1 having about 0.12 wt % Mg and from about 6.0 wt % to about 7.8 wt % Si.

8. An Al—Si—Mg casting having a critical fracture strain and tensile yield strength, the casting comprising:
    a cast body of an alloy composition comprising:
        about 6.0 wt % to about 7.8 wt % Si;
        about 0.10 wt % to about 0.18 wt % Mg;
        less than or equal to about 0.35 wt % Cu;
        less than or equal to about 0.6 wt % Mn;
        less than or equal to about 0.15 wt % Fe;
        and a balance of aluminum and impurities; wherein, the casting has a critical fracture strain of at least about 10% and a tensile yield strength of at least 100 MPa when the composition has undergone a heat treating process that includes solution heating, quenching, and aging.

9. The casting of claim 8, wherein the cast body is in a T6 temper and has a tensile yield strength ranging from 100 MPa to 180 MPa.

10. The casting of claim 8, wherein the cast body has an elongation of 14% or greater.

11. The casting of claim 8 wherein the alloy composition further comprises at least one Si modifier present in an amount less than or equal to 0.02 wt %, wherein the at least one Si modifier comprises Ca, Na, Sr, Sb or a combination thereof.

12. The casting of claim 8 wherein the alloy composition further comprises at least one grain refiner present in an amount less than or equal to 0.1 wt %, wherein the at least one grain refiner is selected from the group consisting of Ti, B and C.

13. The casting of claim 8 wherein the heat treating includes aging times of less than about 10 hours.

14. The casting of claim 8 having about 7.0 wt % Si and from about 0.10 wt % to about 0.18 wt % Mg.

15. The casting of claim 8 having about 0.12 wt % Mg and from about 6.0 wt % to about 7.8 wt % Si.

16. The casting of claim 8, wherein the critical fracture strain of the heat treated alloy composition is greater than 10%, the yield tensile strength exceeds 100 MPa, and the heat treatment process comprises T6 or T7 to further provide an elongation that exceeds 14%.

* * * * *